(12) United States Patent
Ikehara et al.

(10) Patent No.: US 12,270,539 B2
(45) Date of Patent: Apr. 8, 2025

(54) DECORATIVE LAMINATE, DECORATIVE MOLDED ARTICLE, AND DISPLAY DEVICE

(71) Applicant: ALPS ALPINE CO., LTD., Tokyo (JP)

(72) Inventors: Hiroshi Ikehara, Fukushima (JP); Hiroyuki Kato, Fukushima (JP); Kentaro Yamaguchi, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/888,598

(22) Filed: Sep. 18, 2024

(65) Prior Publication Data

US 2025/0012426 A1    Jan. 9, 2025

Related U.S. Application Data

(63) Continuation of application No. PCT/JP2022/046255, filed on Dec. 15, 2022.

(30) Foreign Application Priority Data

Mar. 24, 2022 (JP) .................... 2022-048595

(51) Int. Cl.
| | | |
|---|---|---|
| *F21V 9/00* | (2018.01) | |
| *B29C 45/14* | (2006.01) | |
| *B60Q 3/14* | (2017.01) | |
| *G02B 5/00* | (2006.01) | |

(52) U.S. Cl.
CPC .......... *F21V 9/00* (2013.01); *B29C 45/14688* (2013.01); *B60Q 3/14* (2017.02); *G02B 5/00* (2013.01)

(58) Field of Classification Search
CPC . F21V 9/00–45; B60Q 3/14; B29C 45/14688; B32B 7/12; G02B 5/00; G02B 5/26
See application file for complete search history.

(56) References Cited

U.S. PATENT DOCUMENTS

| | | | |
|---|---|---|---|
| 12,059,885 B2 * | 8/2024 | Suzuki ..................... | G02B 5/22 |
| 2017/0282716 A1 | 10/2017 | Mochizuki et al. | |
| 2023/0074600 A1 | 3/2023 | Hama et al. | |

FOREIGN PATENT DOCUMENTS

| | | |
|---|---|---|
| JP | 2017-187477 | 10/2017 |
| JP | 6839319 | 3/2021 |
| JP | 2021-123016 | 8/2021 |

OTHER PUBLICATIONS

International Search Report for PCT/JP2022/046255 mailed on Feb. 28, 2023.

* cited by examiner

*Primary Examiner* — Sean P Gramling
(74) *Attorney, Agent, or Firm* — IPUSA, PLLC

(57) ABSTRACT

A decorative laminate for transmitting light includes a light-permeable substrate, a light adjusting layer, an interference pigment print layer, and a black semi-transparent print layer. The light adjusting layer has, at a surface opposite from the substrate, an uneven part formed to match a design's shape shown by the interference pigment print layer. The interference pigment print layer has first light transmitting parts, through which the light is transmitted. The black semi-transparent print layer has second light transmitting parts, at positions at a main surface of the black semi-transparent print layer where, in plan view, the second light transmitting parts at least partially overlap the first light transmitting parts. The first light transmitting parts and the second light transmitting parts are voids in a coating layer and formed at a main surface of the interference pigment print layer and at the main surface of the black semi-transparent print layer, respectively.

14 Claims, 7 Drawing Sheets

(LIGHT IS TURNED OFF)

(LIGHT IS TURNED ON)

DECORATIVE LAMINATE, DECORATIVE MOLDED ARTICLE, AND DISPLAY DEVICE

CROSS-REFERENCE TO RELATED APPLICATION

This application is a continuation application of International Application No. PCT/JP2022/046255, filed on Dec. 15, 2022, and designated the U.S., which is based upon and claims priority to Japanese Patent Application No. 2022-048595, filed on Mar. 24, 2022. The entire contents of all these applications are incorporated herein by reference.

BACKGROUND OF THE INVENTION

1. Field of the Invention

The present disclosure relates to a decorative laminate, a decorative molded article, and a display device.

2. Description of the Related Art

A decorative laminate with designs such as patterns or pictures is provided, for example, on a surface of a molded article such as a vehicle's interior part, a building interior material, or a casing for home appliances, in order to make the molded article blend in with its surroundings. A light source is provided on the back of this molded article so as to allow display of, for example, images, figures, characters, and so forth. When the light source is turned off, the design on the decorative laminate's surface is shown; on the other hand, when the light source is turned on, the light emitted from the light source transmits through the molded article and the decorative laminate, and the surface of the decorative laminate is lit.

As an example of a decorative laminate for decorating a molded article, a decorative sheet is disclosed, which includes a base film, a first pattern layer, a second pattern layer, an optical-functional layer, a transmittance-adjusting layer, and an adhesive layer. This decorative sheet shows a wood-grain pattern when the light source of the display device is turned off, and displays images on the surface of the decorative sheet when the light source is turned on (see, for example, Japanese Patent Publication No. 6839319).

SUMMARY OF THE INVENTION

A decorative laminate for transmitting light emitted from a light source, the decorative laminate including:
  a light-permeable substrate with a first main surface and a second main surface, the second main surface being a surface opposite the first main surface;
  a light adjusting layer provided on a side of the substrate where the first main surface is situated;
  an interference pigment print layer provided on a side of the substrate where the second main surface is situated, containing a plurality of types of interference pigments and an ultra-violet absorber in a binder resin, and showing a visible design; and
  a black semi-transparent print layer on a surface of the interference pigment print layer that is opposite from the substrate, and containing a pigment and an ultra-violet absorber in a binder resin, in which:
  the light adjusting layer has, at a surface opposite the substrate, an uneven part that is formed to match a shape of the design shown by the interference pigment print layer;
  the interference pigment print layer has first light transmitting parts, through which the light is transmitted;
  the black semi-transparent print layer has second light transmitting parts, through which the light is transmitted, at positions at a main surface of the black semi-transparent print layer where, in plan view, the second light transmitting parts at least partially overlap the first light transmitting parts; and
  the first light transmitting parts and the second light transmitting parts are voids in a coating layer and formed at a main surface of the interference pigment print layer and at the main surface of the black semi-transparent print layer, respectively.

DETAILED DESCRIPTION OF THE PREFERRED EMBODIMENTS

Figure 1:
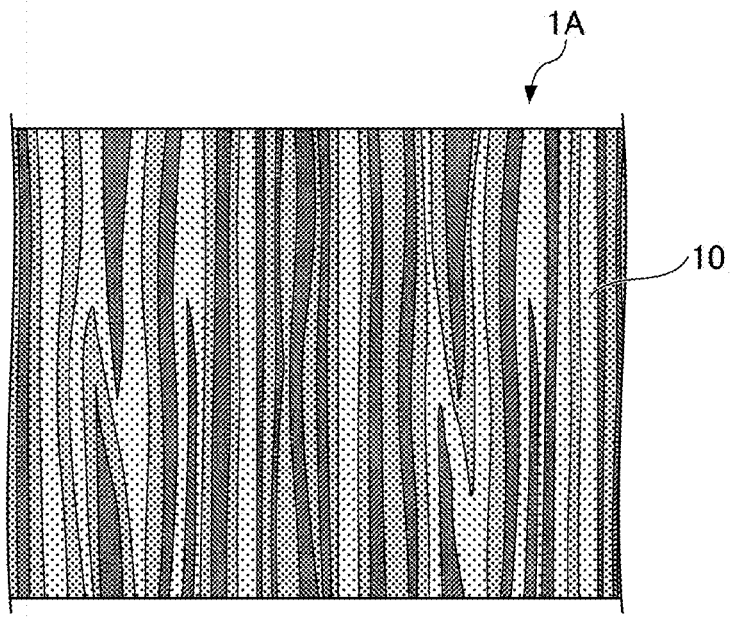
FIG. 1 shows an example of a plan view of the decorative laminate according to an embodiment of the present disclosure.

Now, given a decorative laminate such as the decorative sheet of Japanese Patent Publication No. 6839319 above, it is desirable to keep the light transmittance of the decorative laminate to, for example, 20% or less when the decorative laminate has a wood-grain pattern, for example, so that the decorative laminate can have both: "stealth" properties, which allow the light source positioned on the back side of the molded article to be not visible through the surface of the decorative laminate when the light source is turned off; and light permeability, which allows the light from the light source to transmit through the decorative laminate when the light source 2 is turned on.

However, reducing the light transmittance of a decorative laminate to, for example, 20% or less poses another problem: the images displayed on the surface of the decorative laminate tend to be dark. If the light transmittance of a decorative laminate such as the decorative sheet of Japanese Patent Publication No. 6839319 is increased to, for example, 25% or higher, the entire surface of the decorative laminate becomes whitish and the wood-grain pattern can no longer be seen. The problem is that there is a limit to how bright an image displayed on the surface of the decorative laminate can be, while maintaining the stealth properties of the decorative laminate.

Also, while increasing the brightness of the light source is possible, increasing the brightness of the light source leads to increased power consumption, and therefore is not desirable.

Accordingly, there may be a need to provide a decorative laminate that can: ensure sufficient stealth properties so that, when the light source positioned on the back side of a molded article is turned off, the light source cannot be seen through the surface of the decorative laminate; transmit and display the light emitted from the light source at high brightness, without increasing the brightness of the light source when the light source is turned on; and increase the diffuse transmittance to provide improved visibility while the light source is turned on.

An embodiment of the present disclosure will be described in detail below. Note that, to help understand the following description, the same components will be assigned the same reference numerals in each drawing, and duplicated descriptions will be omitted. Also, the scale of components in the drawings may be different from their actual size. Furthermore, in this specification, the use of "to" when indicating a range of numerical values means that the range includes the values written before and after "to" as the lower and upper limits of the range, unless otherwise specified.

Note that, in this specification, the terms "layer," "sheet," and "film" are simply variations of each other and are not to be distinguished from one another. For example, the term "sheet" includes a member that may be referred to as a "layer" or a "film."

<Decorative Laminate>

Figure 2:
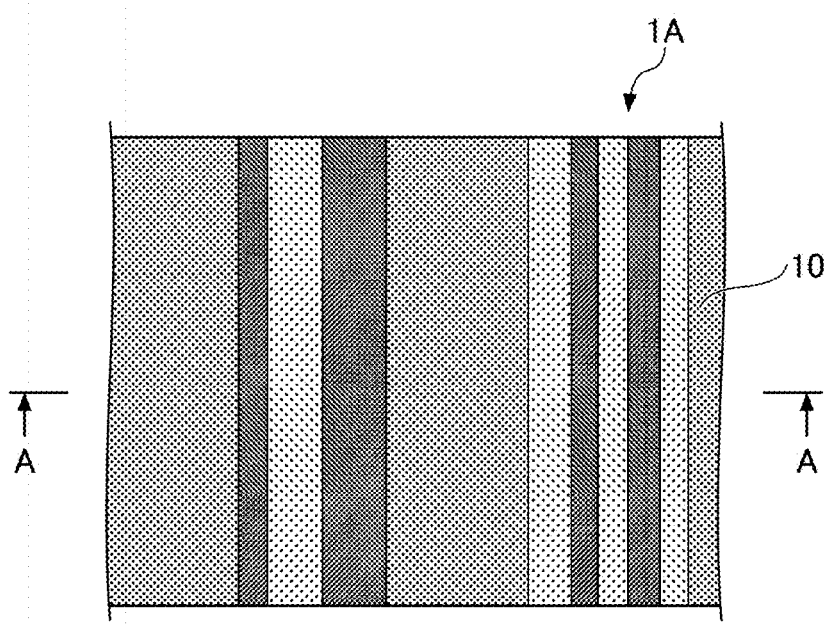
FIG. 2 is a partially-enlarged view of FIG. 1.
Figure 3:
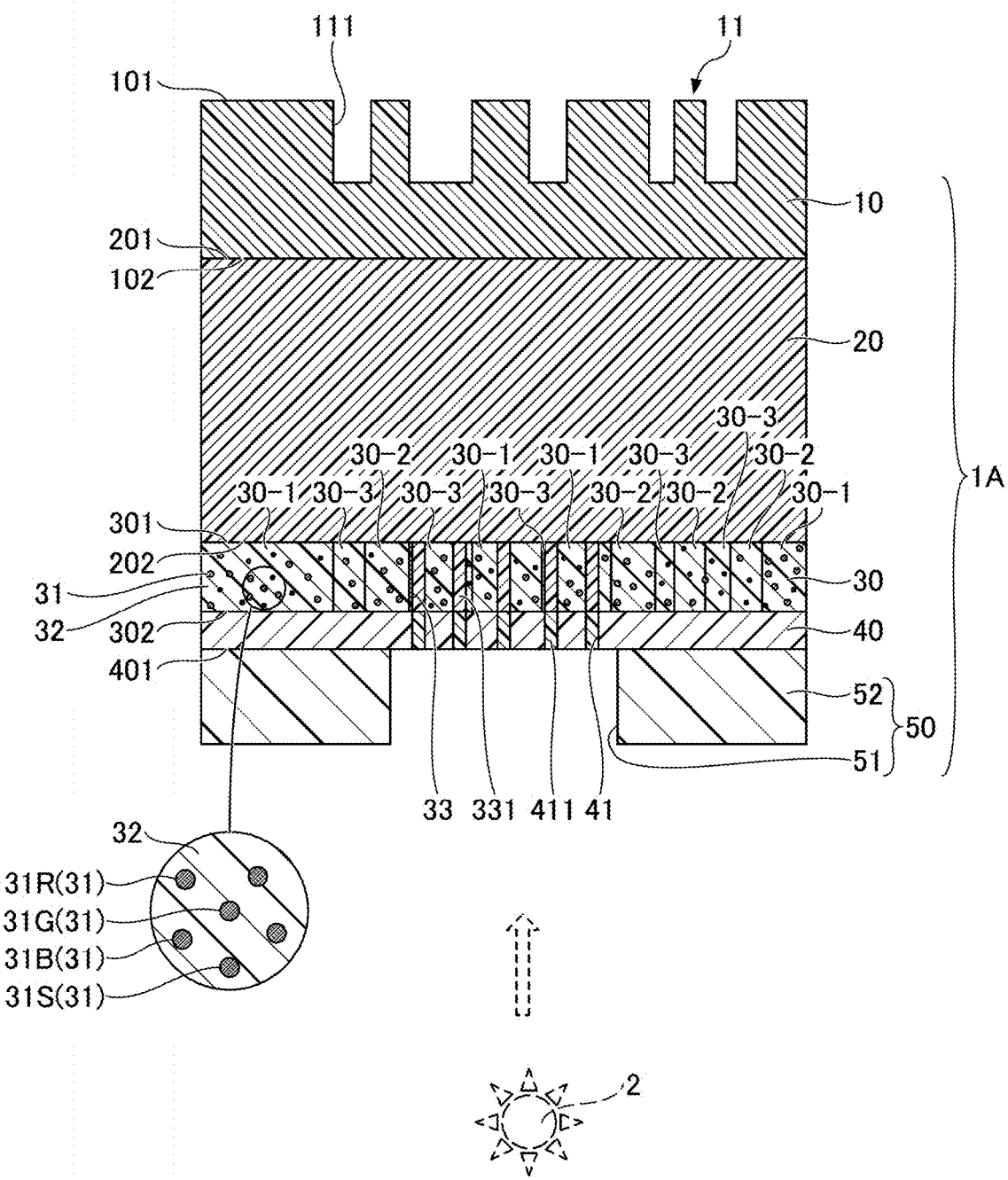
FIG. 3 is a cross-sectional view taken along the line A-A in FIG. 2.

A decorative laminate (hereinafter simply referred to as "laminate") according to an embodiment of the present disclosure will be explained. FIG. 1 is a plan view of an example of a laminate according to an embodiment of the present disclosure; FIG. 2 is a partially enlarged view of FIG. 1; and FIG. 3 is a cross-sectional view taken along the line A-A in FIG. 2, and is a cross-sectional view that shows a schematic example structure of the laminate according to the present embodiment. As illustrated in FIG. 1 and FIG. 2, a laminate 1A of the present embodiment has a design consisting of a wood-grain pattern, in which multiple vertical wood grains are drawn on the surface.

Note that the present embodiment will illustrate a case in which the design of the laminate 1A is a wood-grain pattern. However, the design is in no way limited to a wood-grain pattern, and may be any pattern such as a marble pattern, a geometric pattern, a carbon pattern, stripes, polka dots, and a single color; figures and letters may be drawn and written as well.

As illustrated in FIG. 3, the laminate 1A is formed with: a light adjusting layer 10; a transparent substrate layer 20, which is the substrate; a pigment interference print layer 30; a smoked layer 40, which is a black semi-transparent print layer; and a black layer 50, which is a black symbol print layer. These layers are laminated in the order named. Light emitted from a light source 2, which is a light-emitting part, is incident on the back surface (in FIG. 3, situated below the black layer 50) of the laminate 1A. The light transmits through the laminate 1A and emerges on the surface (in FIG. 3, situated above the light adjusting layer 10) of the laminate 1A. Note that the laminate 1A does not necessarily have to include the black layer 50.

For example, when the laminate 1A is used as a decorative panel, a binder for joining with a molding resin is formed on the surface of the smoked layer 40 or the black layer 50 that is exposed to the outside, in the sheet material illustrated in FIG. 3, and the panel can be obtained by sheet insertion.

Note that, in this specification, for ease of understanding, the side of the laminate 1A where the light adjusting layer 10 is located will be referred to as the "surface" of the laminate 1A, and the side of the laminate 1A where the black layer 50 is located will be referred to as the "back surface" of the laminate 1A. In the following description, for ease of understanding, the surface may be referred to by words such as "top" and "upper," and the back surface may be likewise referred to by words such as "bottom" and "lower," but the use of these words does not necessarily refer to the common concept of verticality.

In the laminate 1A, the light adjusting layer 10 having a concavo-convex shape is provided on the surface of the laminate 1A. The interference pigment print layer 30 and the smoked layer 40 positioned below the light adjusting layer 10 have parts where the light permeability is high. Thus, the laminate 1A presents a shape that matches the design of the interference pigment print layer 30 on the surface of the light adjusting layer 10 and imparts a tactile feel. Furthermore, the visible light that enters from the outside is scattered, so as to make the parts having high light permeability (trans-lucency) less noticeable to the naked eye. Also, the overall light transmittance of the laminate 1A can be increased, for example, to 30% to 40%. Consequently, the laminate 1A can have both: stealth properties, which make the light source 2 positioned on the back side of the laminate 1A, and parts without the black layer 50 or the smoked layer 40 not visible when the light source 2 is turned off; and light permeability, which allows the light from the light source 2 to transmit through the laminate 1A when the light source 2 is turned on. By this means, when the light source 2 is turned on, images can be displayed on the surface of the laminate 1A, with high overall brightness, without increasing the brightness of the light source 2.

Note that saying that the laminate 1A is light-permeable means that, assuming that light is emitted from the light source 2 positioned on the back side of the laminate 1A, the laminate 1A is permeable to a degree where the light from the light source 2 can transmit through the laminate 1A, and can also mean that the laminate 1A is permeable or semi-transparent/translucent. The term "permeable" may mean "colorless permeable" and "colored permeable."

The light source 2 is not limited to a particular type. For example, an incandescent lamp, a fluorescent lamp, an LED matrix display, an organic electroluminescence display, a light emitting diode (LED), a liquid crystal display (LCD), or the like may be used. Also, natural light may be used as the light source 2 as well.

(Light Adjusting Layer)

The light adjusting layer 10 may be provided over the entire surface of an upper surface 201, which is the first main surface of the transparent substrate layer 20, or may be provided only in a part of the upper surface 201. From the perspective of protecting the laminate 1A, it is preferable to provide the light adjusting layer 10 over the entire main surface.

The light adjusting layer 10 has a function to protect the surface of the laminate 1A from chemicals such as UV protection creams, and has a hard-coating function to make the surface of the laminate 1A hard and highly scratch-resistant. The light adjusting layer 10 may further have an anti-reflection function, an ultra-violet light blocking function, an infrared light blocking function, an anti-fogging function, an anti-soiling function, an anti-glare function, or the like.

The light adjusting layer 10 is usually transparent or translucent. Viewing the laminate 1A from the light adjusting layer 10 side, the laminate 1A may be colored or may contain a matting agent such as silica, as long as the design of the interference pigment print layer 30 is visible when the light source 2 is turned on.

The colorant is not limited to a particular type. For example: an inorganic pigment such as carbon black, iron black, titanium white, antimony white, yellow lead, titanium yellow, red oxide, cadmium red, ultramarine, and cobalt blue; an organic pigment or dye such as quinacridone red, isoindolinone yellow, and phthalocyanine blue; a metallic pigment made of scaly foil flakes of aluminum, brass, and so forth; and a pearl pigment made of scaly flakes of titanium dioxide-coated mica, basic lead carbonate, and so forth, may be used.

The material to constitute the light adjusting layer 10 is not limited to a particular type. For example, a thermoplastic resin, an acrylic or urethane-based thermosetting resin, an ionizing radiation-curable resin and the like may be used. Among these, a composition containing an ionizing radiation-curable resin is preferable for use to make the light adjusting layer 10, from the perspective of improving scratch resistance and the like. However, the ionizing radiation-curable resin composition is preferably in an uncured state, so that it can match the shape of the final product (for example, a curved surface or the three-dimensional shape of the final product) when it is made the shape of the final product by insertion, forming, or the like.

The ionizing radiation-curable resin used in the formation of the light adjusting layer 10 is a resin that cross-links and hardens when ionizing radiation is emitted thereupon. To be more specific, the ionizing radiation-curable resin herein may refer to a mixture of at least one of a prepolymer, a monomer, and an oligomer that each have a polymerizable unsaturated bond or an epoxy group in its molecule. Ionizing radiation refers to electromagnetic waves or charged particle beams that have an energy quantum whereby molecules can be polymerized or cross-linked. Typically, ultra-violet (UV) radiation or electron beams (EB) are used, but other examples may include electromagnetic waves such as X-rays and gamma rays, as well as charged particle beams such as alpha rays and ion beams. Among ionizing radiation-curable resins, electron-beam curable resins can be made solvent-free, do not require a photopolymerization initiator, have stable curing properties, and therefore are suitable for use in forming the light adjusting layer 10.

A (meth)acrylate monomer having a radically polymerizable unsaturated group in the molecule is suitable for use as an ionizing radiation-curable resin; in particular, a polyfunctional (meth)acrylate monomer is preferable. The polyfunctional (meth)acrylate monomer may be any general polyfunctional (meth)acrylate monomer, and may be any (meth)acrylate monomer having two or more polymerizable unsaturated bonds (2 or more functions), preferably three or more polymerizable unsaturated bonds (3 or more functions), in the molecule. One type of polyfunctional (meth)acrylate may be used alone, or two or more types of polyfunctional (meth)acrylates may be combined and used.

As for the oligomer to be used as the ionizing radiation-curable resin, a (meth)acrylate oligomer having a radical polymerizable unsaturated group in the molecule is preferable. In particular, a polyfunctional (meth)acrylate oligomer having two or more polymerizable unsaturated bonds (two or more functions) in the molecule is preferable. Examples of polyfunctional (meth)acrylate oligomers include polycarbonate (meth)acrylate, urethane (meth)acrylate, epoxy (meth)acrylate, polyester (meth)acrylate, and so forth. One type of polyfunctional (meth)acrylate oligomer may be used alone, or two or more type of these polyfunctional (meth) acrylate oligomers may be combined and used.

Of the ionizing radiation-curable resins named above, polycarbonate (meth)acrylate is preferable for use from the perspective of further improving the appearance of the design, wear resistance, and moldability. It is also preferable to use a combination of polycarbonate (meth)acrylate and urethane (meth)acrylate.

The light adjusting layer 10 may contain various additives depending on what physical properties are desired. The additives may include, for example, a weather resistance improver such as an ultra-violet absorber and a light stabilizer, an abrasion resistance improver, a polymerization inhibitor, a cross-linking agent, an infrared absorber, an antistatic agent, an adhesion improver, a leveling agent, a thixotropy agent, a coupling agent, a plasticizer, a defoamer, a filler, a solvent, a colorant, and so forth. These additives can be selected and used as appropriate. As for the ultra-violet absorber and light stabilizer, a reactive ultra-violet absorber and light stabilizer having a polymerizable group such as a (meth)acryloyl group in the molecule may be used.

The light adjusting layer 10 has an uneven part 11 having a concavo-convex shape on its surface 101. The uneven part 11 is formed to match the shape of the design shown by the interference pigment print layer 30. That is, the concave part 111 constituting the uneven part 11 is formed such that the concave part 111 corresponds to the shape of the design of the interference pigment print layer 30. Note that, to say that the concave part 111 "matches" the shape of the design of the interference pigment print layer 30, this might include the case in which the concave part of the uneven part 11 matches the outline of the design shown by the interference pigment print layer 30, as well as the case in which the concave part of the uneven part 11 substantially matches the outline of the design. Saying that the concave part 111 "substantially matches" the outline of the design of the interference pigment print layer 30, this might include the case in which the concave part of the uneven part 11 matches the outline of the design shown by the interference pigment print layer 30 to a certain extent.

The uneven part 11 in the light adjusting layer 10 imparts a tactile feel to the design and scatters the visible light incident from outside the laminate 1A. When the light source 2 is turned off, a first light transmitting part 33 in the interference pigment print layer 30, second light transmitting parts 41 in the smoked layer 40, and an opening 51 in the black layer 50 can be made visually inconspicuous.

Furthermore, the light adjusting layer 10 may be formed with two or more layers. For example, the light adjusting layer 10 may be configured to provide one or more layers formed with the convex parts of the uneven part 11 and having a function to impart a tactile feel, on a flat layer having a surface protection function such as scratch resistance.

Although the thickness of the light adjusting layer 10 is not limited to a particular type, from the perspective of imparting a surface protection function such as scratch resistance and durability to the surface 101, it is preferably 0.1 µm to 2,000 µm. Note that, since the light adjusting layer 10 has the uneven part 11, the thickness of the light adjusting layer 10 is the thickness at the positions where the convex parts in the uneven part 11 are formed.

The method of forming the light adjusting layer 10 is not limited to a particular type, and the light adjusting layer 10 can be formed using any appropriate method. For example, an ionizing radiation-curable resin composition may be prepared, and then the ionizing radiation-curable resin composition prepared thus may be applied to a surface to form an uncured resin layer.

The viscosity of the ionizing radiation-curable resin composition may be any level insofar as an uncured resin layer can be formed using the following methods of applying the ionizing radiation-curable resin composition.

The ionizing radiation-curable resin composition prepared as described above can be applied by using normal coating methods such as spray coating, roll coating, screen coating, gravure coating, spin coating, reverse coating, kiss coating, bar-coating, blade coating, flow coating, air-knife coating, dip coating, spray coating, and so forth, by using general coating methods such as transfer coating and a method of dropping a small amount of the ionizing radiation-curable resin composition onto the transparent substrate layer 20 and spread it with a doctor blade. By using these coating methods, the ionizing radiation-curable resin composition can be applied substantially uniformly over the transparent substrate layer 20.

Next, the uncured resin layer formed thus is coated with a uncured resin layer having a tactile feel function and consisting of the convex parts of the uneven part 11 and then thermally dried, thereby forming a concavo-convex uncured resin layer, that is, the light adjusting layer 10.

The light adjusting layer 10 is adjusted to fit the shape of the final product by insertion, forming, or the like. After the light adjusting layer 10 is made to resemble the shape of the final product (for example, to fit the final product's curved surface, three-dimensional shape, etc.), the uncured resin layer can be cured by emitting an ionizing radiation such as electron beams or ultra-violet rays.

When electron beams are emitted for ionizing radiation, the accelerating voltage can be adjusted as appropriate depending on the type of the resin used, the layer's thickness, and so forth. For example, an acceleration voltage of 70 kV to 300 kV may be used.

Note that, in electron beam radiation, the higher the acceleration voltage, the greater the penetration. When a resin that is easily damaged by electron beam radiation is used underneath the light adjusting layer 10, the acceleration voltage is selected such that the depth of penetration of the electron beam and the thickness of the light adjusting layer 10 are substantially equal. This makes it possible to prevent or substantially prevent the layers located below the light adjusting layer 10 from being exposed to excessive radiation of electron beams, and to minimize the deterioration of each layer due to exposure to excessive electron beams. In addition, the amount of radiation is adjusted as appropriate, and an amount at which the cross-link density in the light adjusting layer 10 becomes saturated is preferable.

The source of electron beams is not limited to a particular type, and various types of electron beam accelerators, such as Cockcroft-Walton-type, Van de Graft-type, resonant transformer-type, insulating core transformer-type, linear-type, dynamitron-type, and high frequency-type electron beam accelerators can be used.

When ultra-violet rays are emitted to provide ionizing radiation, light containing ultra-violet rays spanning wavelengths of 190 nm to 380 nm may be emitted. The source of ultra-violet rays is not limited to a particular type, and examples thereof include a high-pressure mercury lamp, a low-pressure mercury lamp, a metal halide lamp, and a carbon arc lamp.

(Transparent Substrate Layer)

As illustrated in FIG. 3, the transparent substrate layer 20 is provided at the lower surface 102 of the light adjusting layer 10. The transparent substrate layer 20 has a function to ensure light permeability, the chemical resistance of the interference pigment print layer 30, and the scratch resistance of colored coating layers. By this means, when the light source 2 is positioned on the back side of the laminate 1A, the transparent substrate layer 20 can allow the light emitted from the light source 2 to transmit through the laminate 1A, while more adequately protecting the design of the interference pigment print layer 30.

Although the transparent substrate layer 20 is light-permeable, the transparent substrate layer 20 may be colored a long as, viewing the laminate 1A from the surface, the interference pigment print layer 30's design is visible when the light source 2 is turned on. The transparent substrate layer 20 may contain a matting agent such as silica, a colorant, and the like. As for the colorant, the colorants described above with the light adjusting layer 10 can be used.

The transparent substrate layer 20 is not limited to a particular type as long as it is a material that makes the laminate 1A suitable for two-dimensional and three-dimensional molding, is light-permeable, and can protect the interference pigment print layer 30 and the smoked layer 40 adequately. Examples of materials that can be used for the transparent substrate layer 20 include light-transparent resins, light-permeable elastomers, and glass.

Examples of light-transparent resins include: a polyester-based resin; a polyethylene terephthalate (PET) resin; an acrylic resin; a polyolefin resin such as polypropylene and polyethylene; a polycarbonate resin; a vinyl chloride resin; a polybutylene terephthalate (PBT) resin; a triacetyl cellulose resin; a styrene resin; an acrylonitrile-butadiene-styrene (ABS) resin; bioengineering plastic; and biodegradable plastic. One type among these may be used alone, or two or more types can be combined and used. The transparent substrate layer 20 may be formed by laminating two or more layers of light-transparent resins among from those named above. For example, it is preferable to combine an acrylic resin, bioengineering plastic, or biodegradable plastic with an acrylic resin and create a composite layer. The transparent substrate layer 20 may be formed by laminating two or more layers of the above light-transparent resins. For example, the transparent substrate layer 20 may be a laminate including a layer made of an acrylic resin and a layer made of an ABS resin, or the transparent substrate layer 20 may be a laminate including a layer made of an acrylic resin and a layer made of a polycarbonate resin.

For the light-permeable elastomer, for example, a thermoplastic elastomer (TPE) can be used. The thermoplastic elastomer may be, for example, an amide-based TPE (TPA), an ester-based TPE (TPC), an olefin-based TPE (TPO), a styrene-based TPE (TPS), and an urethane-based TPE (TPU).

The transparent substrate layer 20 may be formed by laminating a light-transparent resin layer and a layer made of a light-permeable elastomer.

The thickness of the transparent substrate layer 20 is not limited to a particular type, but it is preferably, for example, 50 µm to 1, 300 µm, so as to be light-permeable.

To improve the adhesion of the transparent substrate layer 20 to the adjacent layers, at least one of the upper surface 201 and the lower surface 202, which is a second main surface, may be subjected to physical or chemical surface treatment such as oxidation or roughening, on an as-needed basis. Example methods of oxidation include excimer UV treatment, corona discharge treatment, plasma treatment, chromium oxidation treatment, flame treatment, hot-air treatment, ozone ultra-violet treatment, and so forth. Example methods of roughening include sandblasting, solvent treatment, and so on. These surface treatment methods may be selected as appropriate depending on the type of resin constituting the transparent substrate layer 20. Considering each method's advantage and operability, excimer UV treatment and corona discharge treatment may be preferable for use.

(Interference Pigment Print Layer)

As illustrated in FIG. 3, the interference pigment print layer 30 is provided at the lower surface 202 of the transparent substrate layer 20. The interference pigment print layer 30 is a print layer made by mixing interference pigments that express four colors: red, green, blue, and silver. Note that the interference pigments to be mixed are by no means limited to these four colors. That is, two or three colors from among red, green, blue, and silver may be mixed, or five or more colors including colors other than red, green, blue, and silver, such as white, may be mixed.

The interference pigment print layer 30 contains particulate interference pigments 31 of four colors (red, green, blue, and silver) and a binder resin 32, and further contains an ultra-violet absorber as an additive. The interference pigment print layer 30 can be formed by using an ink composition, which is an additive color mixture of particles of the interference pigments 31 of four colors (red, green, blue, and silver).

The interference pigments 31 include: red interference pigments 31R that emit red interference light; green interference pigments 31G that emit green interference light; blue interference pigments 31B that emit blue interference light; and silver interference pigments 31S that emit silver interference light.

The interference pigment print layer 30 includes one or more interference pigment print layers 30-N (N being an integer of 1 or more), depending on the mixed color that appears based on the types of the interference pigments 31R, 31G, 31B and 31S and the respective contents of the interference pigments 31R, 31G, 31B and 31S. According to the present embodiment, the interference pigment print layer 30 includes a first interference pigment print layer 30-1, a second interference pigment print layer 30-2, and a third interference pigment print layer 30-3.

The first interference pigment print layer 30-1, the second interference pigment print layer 30-2, and the third interference pigment print layer 30-3 each contain four types of interference pigments 31 that emit four colors (red, green, blue, and silver) of interference light, with an ultra-violet absorber, in a binder resin 32. According to the present embodiment, the first interference pigment print layer 30-1 expresses the "dark brown" of the wood-grain pattern as a first mixed color obtained by additive color mixing, in which the interference lights of the four types of interference pigments 31 are mixed in specific proportions or amounts of light. The second interference pigment print layer 30-2 expresses the "light brown" of the wood-grain pattern as a second mixed color obtained by additive color mixing, in which the interference lights of the four types of interference pigments 31 are mixed in specific proportions or amounts of light. The third interference pigment print layer 30-3 expresses the "brown" of the wood-grain pattern as a third mixed color obtained by additive color mixing, in which the interference lights of the four types of interference pigments 31 are mixed in specific proportions or amounts of light.

Note that, regarding the three mixed colors (the first mixed color, the second mixed color, and the third mixed color), as illustrated in FIG. 3, the first interference pigment print layer 30-1, the second interference pigment print layer 30-2, and the third interference pigment print layer 30-3 are not formed on the same surface but are formed in layers. Nevertheless, for ease of understanding, the present embodiment will be described on the assumption that the first interference pigment print layer 30-1, the second interference pigment print layer 30-2, and the third interference pigment print layer 30-3 are formed on the same surface, as illustrated in FIG. 3. Also, at least one of the first interference pigment print layer 30-1, the second interference pigment print layer 30-2, and the third interference pigment print layer 30-3 may be formed by laminating multiple layers.

The dark brown of the first interference pigment print layer 30-1, the light brown of the second interference pigment print layer 30-2, and the brown of the third interference pigment print layer 30-3 can be expressed by adjusting the respective proportions of the interference pigments 31R, 31G, 31B, and 31S to be mixed.

The interference pigments 31R, 31G, 31B, and 31S contained in the first interference pigment print layer 30-1 and the second interference pigment print layer 30-2 may be the same type or different types.

If the interference pigments 31R, 31G, 31B, and 31S contained in the first interference pigment print layer 30-1 and the second interference pigment print layer 30-2 are of different types, interference pigments 31 to emit interference light of the same color (for example, red) may emit interference lights of varying frequencies, or interference pigments 31 may all emit the same color (for example, red) or emit different colors (including blue, for example).

As illustrated in FIG. 2, the first interference pigment print layer 30-1 and the second interference pigment print layer 30-2 have different planar shapes. By combining the first interference pigment print layer 30-1 and the second interference pigment print layer 30-2, a wood-grain design such as the one illustrated in FIG. 1 is shown on the surface of the interference pigment print layer 30.

Figure 4:
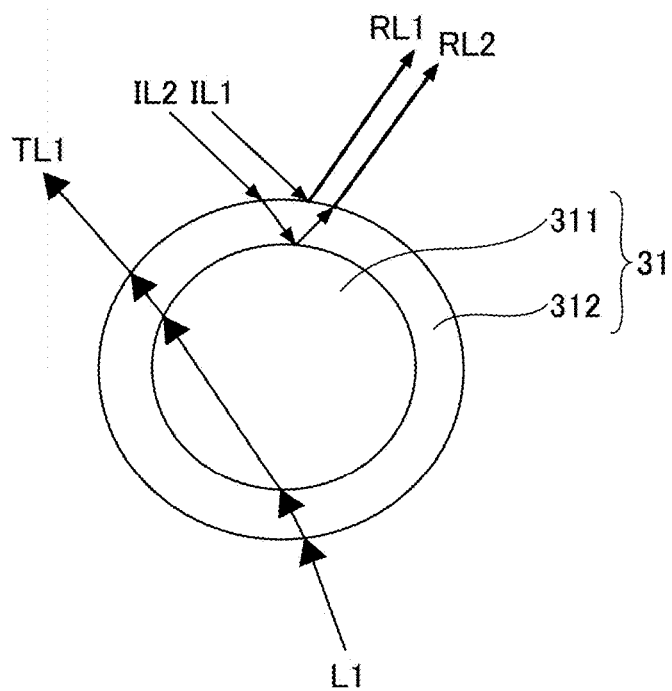
FIG. 4 is a schematic diagram for explaining the reflection and transmission of light in an interference pigment.

FIG. 4 is a diagram showing an example schematic cross-sectional structure of an interference pigment 31. As illustrated in FIG. 4, the interference pigment 31 has a core part 311 and a thin shell part 312 encircling the core part 311. The core part 311 and the shell part 312 allow any visible light to transmit therethrough, depending on the wavelength. The core part 311 and the shell part 312 may be made of materials having different refractive indices. For example, the core part 311 may be made of a material having a smaller refractive index than the shell part 312.

When incident light IL1 having a predetermined wavelength and incident light IL2 having a different wavelength from that of the incident light IL1 are incident on the shell part 312 of the interference pigment 31, the incident light IL1 is reflected by the surface of the shell part 312 and becomes reflected light RL1, while the incident light IL2 travels inside the shell part 312, reflected by the core part 311, and becomes reflected light RL2. The reflected light RL1 and the reflected light RL2 interfere with each other and amplify each other, so that the interference light of a particular wavelength is visually perceived as being more intense. For example, by adjusting the thickness of the shell part 312 or the like such that the wavelength to be amplified by interference matches the wavelength of a specific color (for example, red), an interference pigment of the specific color (for example, red) can be obtained.

When light L1 from the light source 2 enters the interference pigment 31, the light L1 transmits through the interference pigment 31 and exits from the other side of the interference pigment 31 as transmitted light TL1. Therefore, even when the laminate 1A includes the first interference pigment print layer 30-1, second interference pigment print layer 30-2, and third interference pigment print layer 30-3, light from the light source 2 is visible from the surface 101 of the laminate 1A.

Also, the laminate 1A has the light adjusting layer 10 at a location closer to the surface of the laminate 1A than are the first interference pigment print layer 30-1, the second interference pigment print layer 30-2, and the third interference pigment print layer 30-3. The light adjusting layer 10 has, as its optical function, a characteristic of reflecting light incident on the surface 101 of the light adjusting layer 10. In other words, having a characteristic of reflecting light incident on the surface 101, the light adjusting layer 10 can have a reflection characteristic that increases the proportion of at least one of: the amount of light from the light source 2; and the amount of visible light exhibiting the design (wood-grain pattern) of the first interference pigment print layer 30-1, the second interference pigment print layer 30-2, and the third interference pigment print layer 30-3, beyond the amount of visible light that is reflected by the surface 101 and visually perceived on the surface of the laminate 1A.

Note that the amount of visible light exhibiting the design is the amount of visible light that represents the design combining the planar shapes of the first interference pigment print layer 30-1, the second interference pigment print layer 30-2, and the third interference pigment print layer 30-3. The amount of light from the light source 2 is the amount of transmitted light, which refers to the light having transmitted through the first interference pigment print layer 30-1, the second interference pigment print layer 30-2, and the third interference pigment print layer 30-3.

The ultra-violet absorber contained as an additive in the interference pigment print layer 30 has an absorption wavelength in the ultra-violet range. To be more specific, the ultra-violet absorber has a maximum absorption wavelength in the wavelength range between 315 nm and 400 nm, inclusive. Since the interference pigment print layer 30 contains an ultra-violet absorber, the interference pigment print layer 30 can be formed by using UV laser processing.

As for the ultra-violet absorber, for example, a benzotriazole-based ultra-violet absorber, a benzophenone-based ultra-violet absorber, a triazine-based ultra-violet absorber, a benzoate-based ultra-violet absorber, and so forth can be used. Each one of these may be used alone, or two or more of them may be combined and used.

The benzotriazole-based ultra-violet absorber may be a benzotriazole compound containing, for example, 2-(2'-hydroxy-5'-methylphenyl)benzotriazole, 2-(2'-hydroxy-3', 5'-di-t-butylphenyl)benzotriazole, 2-(2'-hydroxy-3'-t-butyl-5'-methylphenyl)benzotriazole, 2-(3,5-di-t-pentyl-2-hydroxyphenyl-2-benzotriazole, 2-(2-benzotriazol-2-yl)-4-methyl-6-(3, 4, 5, 6-tetrahydrophthalimidylmethyl)phenol, 2-(2-hydroxy-4-octyloxyphenyl)-2-benzotriazole, 2-(2-hydroxy-5-t-octylphenyl)-2-benzotriazole, and so forth.

The benzophenone-based ultra-violet absorber may be a benzophenone compound containing, for example, 2-hydroxy-4-n-octoxy-benzophenone, 2-hydroxy-4-dodecyloxy-benzophenone, 2-hydroxy-4-octadecyloxy-benzophenone, 2-hydroxy-4-benzyloxy-benzophenone, 1,4-bis(4-benzoyl-3-hydroxyphenoxy)-butane, and so forth.

The triazine-based ultra-violet absorber may be a hydroxyphenyltriazine compound containing, for example, 2,4-bis[2-hydroxy-4-butoxyphenyl]-6-(2,4-dibutoxyphenyl)-1,3,5-triazine, 2,4-diphenyl-6-(2-hydroxy-4-methoxyphenyl)-1,3,5-triazine, 2,4-diphenyl-6-(2-hydroxy-4-ethoxyphenyl)-1,3,5-triazine, 2,4-diphenyl-6-(2-hydroxy-4-propoxyphenyl)-1,3,5-triazine, 2,4-diphenyl-6-(2-hydroxy-4-butoxyphenyl)-1,3,5-triazine, 2,4-diphenyl-6-(2-hydroxy-4-butoxyphenyl)-1,3,5-triazine, 2-(2-hydroxy-4-[1-octyloxycarbonylethoxy]phenyl)-4,6-bis(4-phenylphenyl)-1,3,5-triazine, 2,4-diphenyl-6-(2-hydroxy-4-hexyloxyphenyl)-1,3,5-triazine, 2,4-diphenyl-6-(2-hydroxy-4-octyloxyphenyl)-1,3,5-triazine, 2,4-diphenyl-6-(2-hydroxy-4-dodecyloxyphenyl)-1,3,5-triazine, 2,4-diphenyl-6-(2-hydroxy-4-benzyloxyphenyl)-1,3,5-triazine, and so forth.

The benzoate-based ultra-violet absorber may be a benzoate compound containing, for example, 2,4-di-t-butylphenyl-3,5-di-t-butyl-4-hydroxybenzoate, hexadecyl-3,5-di-t-butyl-4-hydroxybenzoate, and so forth.

The binder resin 32 has a function to fix the interference pigment 31 inside the transparent substrate layer 20, and is light-permeable. For the binder resin, for example, a polyisocyanate resin, the light-transparent resin of the transparent substrate layer 20, and so forth can be used.

The interference pigment print layer 30 has first light transmitting parts 33 that are light-permeable. Each first light transmitting part 33 is an unprinted area where no interference pigment 31 is contained.

Each first light transmitting part 33 can be formed with a coating-layer void part 331, which is a through-hole formed in the interference pigment print layer 30. The voids of the coating layer void part 331 may contain a cured substance of a light-permeable, filler resin composition. Assuming that a cured substance of a light-permeable filler resin composition is contained in the voids of the coating layer void parts 331, for example, when a binder layer is provided between a molded article 110 (illustrated in FIG. 6, which will be described later) and the laminate 1A, the light-permeable filler resin composition can also be used as the resin to form the binder layer.

The filler resin composition in the voids of the coating layer void parts 331 contains, as a main material, a transparent resin such as an acrylic resin, an urethane resin, a polyester resin, a polyvinyl acetate resin, a vinyl chloride resin, or a vinyl chloride-vinyl acetate copolymer. An additive for improved adhesive strength may be contained as a secondary material. Note that the "main material" refers to the material that accounts for more than half of the mass of the entire filler resin composition.

For the filler resin composition, a general binder resin can be used. For example, when a binder layer is provided between the molded article 110 (illustrated in FIG. 6, which will be described later) and the laminate 1A, the binder resin that constitutes the binder layer can be used.

The first light transmitting part 33 may be formed in any suitable shape in plan view, such as a circle, an ellipse, or a polygon such as a square. The interference pigment print layer 30 has high light permeability in the first light transmitting part 33. When the light source 2 is turned on, the first light transmitting parts 33 can increase the light transmittance of the cured substance of the filler resin composition, such as a binder layer (not shown), to 70% to 98%. Also, when the light source 2 is turned off, the influence on the design that can be seen through the surface of the laminate 1A can be reduced.

The first light transmitting parts 33 may be positioned on a main surface 301 in any suitable arrangement, such as a hexagonal lattice pattern (also referred to as a "regular triangular lattice pattern," "houndstooth lattice pattern," etc.), a square lattice pattern, a diagonal lattice pattern, or a linear pattern.

The first light transmitting parts 33 may be positioned substantially evenly at predetermined intervals on the main surface 301 in plan view, or may be positioned irregularly. To allow the first light transmitting parts 33 to have uniform light permeability, it is preferable to position the first light transmitting parts 33 evenly at predetermined intervals on the main surface 301.

In plan view of the interference pigment print layer 30, the proportion of the first light transmitting parts 33 are preferably 0.1% to 35%, more preferably 0.5% to 18%, and even more preferably 1.0% to 15%. If the proportion of the first light transmitting parts 33 is within the above-preferred ranges, the interference pigment print layer 30 can have both stealth properties and high light permeability.

To form the first light transmitting parts 33, the first interference pigment print layer 30-1, the second interference pigment print layer 30-2, and the third interference pigment print layer 30-3 are formed, and then the voids of the coating layer void parts 331 are formed by laser processing or the like. Once such voids of the coating layer void parts 331 are formed, the first light transmitting parts 33 can be formed by filling the voids of the coating layer void parts 331 with a light-permeable filler resin composition. For example, a method of applying a filler resin composition containing a main material and a secondary material, such as a transparent binder resin, according to a general coating method and drying it, a method of applying a heat-melted, light-permeable filler resin composition according to a general coating method and solidifying it, a method such as injection molding of a light-permeable molding resin, and the like may be used.

Example methods of applying the filler resin composition include ordinary coating methods such as roll coating, screen coating, gravure coating, spin coating, reverse coating, kiss coating, bar coating, blade coating, flow coating, air-knife coating, dip coating, and spray coating.

Note that the interference pigment print layer 30 may be, for example, a thin metallic film layer that is metalized to be light-permeable. The thin metallic film layer is formed, for example, by vapor deposition of a metal.

(Smoked Layer)

The smoked layer 40 is provided at the lower surface 302 of the interference pigment print layer 30. The smoked layer 40 is a single layer and has a predetermined range of light transmittance (for example, considering the smoked layer 40 alone, 1% to 70%, more preferably 1% to 47%). The smoked layer 40 has a function to make the design of the interference pigment print layer 30 easier to see when the light source 2 is turned off, thereby improving the visibility and distinguishability of the design and the quality of display, and setting the entire laminate 1A, including the voids of the coating layer void parts 331, to a light transmittance of a predetermined range (30% to 50%) when the light source 2 is turned on. In addition, the smoked layer 40 has a function to make the boundary between the opening 51 and the light blocking part 52 of the black layer 50 less visible.

The smoked layer 40 can be formed, for example, by printing an ink composition containing a pigment or a dye of a light attenuation color (for example, black) and an ultraviolet absorber in a transparent binder resin. For the smoked layer 40, for example, a layer formed by printing a black ink composition can be used. The smoked layer 40 may be, for example, a thin metallic film layer that is metalized to be light-permeable. The thin metallic film layer is formed, for example, by vapor deposition of a metal.

Like the interference pigment print layer 30, the smoked layer 40 has second light transmitting parts 41 that are light-permeable. Like the first light transmitting parts 33, each second light transmitting part 41 is an unprinted area where no interference pigment 31 is contained.

Each second light transmitting parts 41 is located at a position where it at least partially overlaps a first light transmitting part 33 in plan view of the main surface of the smoked layer 40. It is preferable to position the second light transmitting parts 41 at substantially the same positions as the first light transmitting parts 33 on the main surface of the smoked layer 40 in plan view. Note that locations that are "substantially the same" may be literally the same location, or may be locations that are slightly shifted but that can nevertheless be considered as being the same location.

Each second light transmitting part 41 can be formed with a coating-layer void part 411 in the smoked layer 40, as in the interference pigment print layer 30. It is preferable if each coating-layer void part 411 contains a cured substance of a light-permeable filler resin composition. For the light-permeable filler resin composition to fill the inside of the second light transmitting parts 41, the light-permeable filler resin composition filled in the voids of the coating layer void parts 331 can be used.

Note that the transparent filler resin composition may be provided only in the voids of the coating layer void parts 331 of the interference pigment print layer 30 or in the voids of the coating layer void parts 411 of the smoked layer 40, or may be provided only in part of the voids of the coating layer void parts 331 and 411.

The second light transmitting parts 41 may be shaped and positioned the same as the first light transmitting parts 33, may be shaped and positioned differently. From the perspective of allowing the light from the light source 2 to transmit through the interference pigment print layer 30 and the smoked layer 40 with ease, it is preferable to make the shape and positioning of the second light transmitting parts 41 the same as, or different from, those of the first light transmitting parts 33.

The second light transmitting parts 41 can be formed by a method such as laser processing, like the first light transmitting parts 33.

It is preferable to make the proportion of the second light transmitting parts 41 the same as that of the first light transmitting parts 33.

In plan view of the interference pigment print layer 30, if the second light transmitting parts 41 are located in the same positions or substantially the same positions as the first light transmitting parts 33, the proportion of the first light transmitting parts 33 and the second light transmitting parts 41, in plan view of the interference pigment print layer 30 or the smoked layer 40, is preferably 0.1% to 20%, like the proportion of the first light transmitting parts 33, more preferably 0.5% to 18%, and even more preferably 1.0% to 15%.

The light transmittance of the part where the interference pigment print layer 30 and the smoked layer 40 are laminated, that is, the light transmittance of the part where the interference pigment print layer 30 with the first light transmitting parts 33 and the second light transmitting parts 41 and the smoked layer 40 are laminated, is preferably 23% to 518, more preferably 33% to 41%. For example, the light transmittance in parts of the interference pigment print layer 30 where no first light transmitting part 33 is present is approximately 85%. The light transmittance in parts of the interference pigment print layer 30 where the first light transmitting parts 33 are present is approximately 86%. The light transmittance in parts of the smoked layer 40 where no second light transmitting part 41 is present is approximately 47%. The light transmittance in parts of the smoked layer 40 where the second light transmitting parts 41 are present is approximately 53%. The light transmittance in parts where the interference pigment print layer 30 and the smoked layer 40 without the first light transmitting parts 33 and second light transmitting parts 41 are laminated is preferably 18% to 46%, more preferably 28% to 36%. The interference pigment print layer 30, the smoked layer 40, and the laminated parts of the interference pigment print layer 30 and the smoked layer 40 each have the above-described light transmittance, so that, in parts where the first light transmitting parts 33 and the second light transmitting parts 41 are present, the light transmittance in parts where the smoked layer 40 and the interference pigment print layer 30 are laminated can be adjusted to 23% to 51%.

The sum of the thicknesses (laminated thickness) of the laminated interference pigment print layer 30 and smoked layer 40 is preferably 1 μm to 50 μm, more preferably 10 μm to 30 μm.

(Black Layer)

The black layer 50 is provided at the lower surface 401 of the smoked layer 40. The black layer 50 has a shape that matches the pattern to be displayed, and includes: an opening 51 where the light from the light source 2 transmits through; and light blocking parts 52 positioned around the opening 51 and having light blocking properties.

The opening 51 is formed in a rectangular shape in a cross-sectional view, but may be formed in a trapezoidal shape as well. By forming the opening 51 in a trapezoidal shape, depending on the material and type of the molded article 110 (see FIG. 6) where the lower surface of the black layer 50 (the lower side in FIG. 3) is placed, the molded article 110 (see FIG. 6) can be inserted in the opening 51 with ease, without creating a gap.

The black layer 50 may be formed in the same way as the smoked layer 40, except that the content of the pigment or dye of a light attenuation color (for example, black) used to form the smoked layer 40 is increased so that the light transmittance is approximately zero. Like the smoked layer 40, for the black layer 50, for example, a layer formed by printing a black ink composition can be used. The black layer 50 may be, for example, a metallic layer that is electrically conductive and made of a metal with low light permeability. The metallic layer is formed by a general coating method of a conductive paint, such as screen coating.

Thus, the laminate 1A of the present embodiment includes a light adjusting layer 10, a transparent substrate layer 20, an interference pigment print layer 30, and a smoked layer 40. The light adjusting layer 10 has, where its lower surface 102 is located, an uneven part 11 that is formed to match the shape of the design shown by the interference pigment print layer 30. Consequently, the light adjusting layer 10 can show the design displayed on the interference pigment print layer 30 in the uneven part 11, while imparting a tactile feel that matches the design. Furthermore, the light adjusting layer 10 can make the boundaries between the first light transmitting parts 33 of the interference pigment print layer 30, the second light transmitting parts 41 of the smoked layer 40, and the black layer 50 less noticeable by the diffuse reflection, refraction, and scattering of visible light incident from the outside.

By providing the smoked layer 40 underneath the interference pigment print layer 30, the colors of the design of the interference pigment print layer 30 can be made more vivid. Also, the interference pigment print layer 30 and the smoked layer 40 have first light transmitting parts 33 and second light transmitting parts 41, respectively. Consequently, the interference pigment print layer 30 and the smoked layer 40 exhibit stealth properties that reduce the visibility of the light source 2 located on the back side of the laminate 1A and the ends of the opening 51 from the surface of the decorative laminate when the light source 2 is turned off, and also exhibit light permeability that allows the light from the light source 2 to transmit through the laminate 1A when the light source 2 is turned on, thereby improving the overall light transmittance of the laminate 1A to 30% to 50%. By this means, when the light source 2 is turned on, the laminate 1A can transmit and show the light from the light source 2 more efficiently and clearly, without increasing the brightness of the light source 2, resulting in display with high overall brightness, and, when the light source 2 is not turned on, the design of the interference pigment print layer 30 can be shown.

That is, the interference pigments 31 of four colors (red, green, blue, and silver) contained in the interference pigment print layer 30 are special pigments that can express colors by combining with a black layer such as the smoked layer 40. The interference pigment print layer 30, containing interference pigments 31 of four colors (red, green, blue, and silver), a transparent binder resin 32, and an ultra-violet absorber, can exhibit, for example, a light transmittance of approximately 33% to 41% in parts where the voids of the coating layer void parts 331 of the first light transmitting parts 33 are not formed, and can exhibit an overall light transmittance of approximately 79% (of this, the diffuse light transmittance is approximately 33%). The interference pigment print layer 30 can exhibit, for example, a light transmittance of approximately 76 to 86% in the first light transmitting parts 33, and can exhibit an overall light transmittance of 80% (of this, the diffuse light transmittance is 42%).

As described above, the smoked layer 40 is an ink composition containing black pigments, an ultra-violet absorber, and a binder resin. Its light transmittance is obtained by subtracting the light transmittance of the first light transmitting parts 33 from the light transmittance of parts where the second light transmitting parts 41 are not formed. The smoked layer 40 has a predetermined light transmittance (for example, approximately 40%) by having the second light transmitting parts 41. By having the second light transmitting parts 41 on its main surface, the smoked layer 40 cannot be identified by the naked eye, and can, for example, have a predetermined light transmittance (for example, 30% to 40%), exhibit stealth properties so that the visibility of the light source 2 is reduced when the light source 20 is turned off, and exhibit light permeability that allows the light from the light source 2 to transmit through the laminate 1A when the light source 20 is turned on.

Consequently, when the light source 2 is turned off, the laminate 1A can ensure sufficient stealth properties to prevent the light source 2, which is located on the back side of the molded article, from being visible from the surface of the laminate 1A. When the light source 2 is turned on, the laminate 1A can allow the light emitted from the light source 2 to transmit therethrough and be displayed at high brightness, without increasing the brightness of the light source 2, and increase the diffuse transmittance to provide improved visibility.

Also, by adjusting the proportions of the respective light transmittances of the first light transmitting parts 33 and the second light transmitting parts 41, the variation of the overall light transmittance of the laminate 1A can be reduced. In particular, the interference pigment print layer 30 has tendencies that: its layer thickness is likely to vary between areas where the first light transmitting parts 33 are not formed (that is, unprinted areas) and areas where the first light transmitting parts 33 are formed; and its light transmittance is likely to vary between relatively thick and thin parts of the layer. The laminate 1A can reduce the variation in its overall light transmittance, and therefore can exhibit stealth properties so that the visibility of the light source 2 is reduced when the light source 2 is turned off, and exhibit light permeability that allows the light from the light source 2 to transmit through the laminate 1A when the light source 2 is turned on, while minimizing its variation.

In the laminate 1A, the first light transmitting parts 33 and the second light transmitting parts 41 can be formed using the voids in the coating layer void parts 331 and 411 of the interference pigment print layer 30 and the smoked layer 40. Since the interference pigments 31 are not found in the voids of the coating layer void parts 331 and 411, the voids of the coating layer void parts 331 and 411 are highly light-permeable. Also, the voids of the coating layer void parts 331 and 411 can be formed in any desired shape and number at any desired locations by laser processing or the like. In plan view of the interference pigment print layer 30 and the smoked layer 40, the laminate 1A can form the first light transmitting parts 33 and second light transmitting parts 41 at any locations of the interference pigment print layer 30 and the smoked layer 40 such that the interference pigment print layer 30 and the smoked layer 40 have a predetermined light transmittance (for example, 30% to 50%). Thus, the laminate 1A can: ensure sufficient stealth properties so that the visibility of the light source 2 is reduced when the light source 2 is turned off; when the light source 2 is turned on, allow the light emitted from the light source 2 to transmit through the laminate 1A and be displayed at high brightness, in a stable way, without increasing the brightness of the light source 2; and increase the diffuse transmittance to provide improved visibility and stability when the light source 2 is turned on.

The laminate 1A can include a cured substance of a light-permeable filler resin composition in the voids of the coating layer void parts 331 and 411 that constitute the first light transmitting parts 33 and second light transmitting parts 41. As a result of this, the voids of the coating layer void parts 331 and 411 can maintain high light permeability. Furthermore, when a binder layer is provided between the molded article 110 (illustrated in FIG. 6, which will be described later) and the laminate 1A, the filler resin composition can also serve as the resin to constitute the binder layer. The laminate 1A can therefore stably maintain the overall light transmittance at a desired light transmittance (for example, 30% to 50%), and stably maintain stealth properties that reduce the visibility of the light source 2 when the light source 2 is turned off and light permeability that allows the light from the light source 2 to transmit through the laminate 1A when the light source 2 is turned on. Thus, the laminate 1A can: ensure sufficient stealth properties so that the visibility of the light source 2 and the end of the opening 51 in the black layer 50 is reduced when the light source 2 is turned off; when the light source 2 is turned on, allow the light emitted from the light source 2 to transmit through the laminate 1A and be displayed, on a continuous basis, at high brightness, without increasing the brightness of the light source 2; and increase the diffuse transmittance to provide improved visibility and stability while the light source 2 is turned on.

The laminate 1A may have a light-blocking black layer 50 at the lower surface 401 of the smoked layer 40. The black layer 50 may have an opening 51. The opening 51 is formed so that parts of the lower surface 401 of the smoked layer 40 where the second light transmitting parts 41 are formed are exposed. The black layer 50 allows little light from the light source 2 to transmit through the light blocking part 52. Consequently, the laminate 1A allows the light emitted from the light source 2 to transmit only through the opening 51, and allows the light to transmit through parts of the smoked layer 40 where the second light transmitting parts 41 are formed, so that the stealth properties of the opening 51 in the black layer 50 with a light-blocking function can be maintained reliably, and, when the light source 2 is turned on, the light from the light source 2 can be output from inside the opening 51 at high brightness, without increasing the brightness of the light source 2.

In the laminate 1A, the first light transmitting parts 33 and second light transmitting parts 41 can be provided at substantially the same positions in plan view of the laminate 1A, and the proportion of the first light transmitting parts 33 and second light transmitting parts 41 can be set to 0.1% to 20% in plan view of the interference pigment print layer 30. This allows the laminate 1A to have an overall light transmittance of 30% to 40%, thereby reliably ensuring stealth properties that reduce the visibility of the light source 2 when the light source 2 is turned off, and light permeability that allows the light from the light source 2 to transmit through the laminate 1A when the light source 2 is turned on. Thus, the laminate 1A can: ensure sufficient stealth properties to reduce the visibility of the light source 2 and the end of the opening 51 in the black layer 50 when the light source 2 is turned off; when the light source 2 is turned on, allow the light emitted from the light source 2 to transmit through the laminate 1A and be displayed with high brightness, in a more reliable manner, without increasing the brightness of the light source 2; and increase the diffuse transmittance and provide improved visibility while the light source 2 is turned on.

In the laminate 1A, in plan view of the interference pigment print layer 30 and the smoked layer 40, the first light transmitting parts 33 and second light transmitting parts 41 can be arranged in a hexagonal lattice pattern, a square lattice pattern, a diagonal lattice pattern, or a linear pattern. This makes it possible to form the first light transmitting parts 33 and second light transmitting parts 41 with ease, in any shape and at any locations, making it easy to control the print layer formed by laminating the interference pigment print layer 30 and the smoked layer 40 to have a light transmittance of 30% to 50%. Now that the laminate 1A is easy to control such that the overall light transmittance of the laminate 1A is 30% to 40%, it follows that it is also easier to: ensure sufficient stealth properties to reduce the visibility of the light source 2 and the ends of the opening 51 in the black layer 50 when the light source 2 is turned off; when the light source 2 is turned on, allow the light emitted from the light source 2 to transmit through the laminate 1A and be displayed with high brightness, in a stable way, without increasing the brightness of the light source 2; and increase the diffuse transmittance and provide improved visibility while the light source 2 is turned on.

In the laminate 1A, the sum of the thicknesses of the interference pigment print layer 30 and the smoked layer 40 can be made 1 μm to 50 μm. If the sum of the thicknesses is within the above range, the laminate 1A can reliably ensure the functions of the interference pigment print layer 30 and the smoked layer 40. Therefore, the print layer, formed by laminating the interference pigment print layer 30 and the smoked layer 40, can exhibit a light transmittance of 30% to 50% in a reliable manner. Thus, the laminate 1A can ensure sufficient stealth properties to reduce the visibility of the light source 2 and the end of the opening 51 in the black layer 50 when the light source 2 is turned off, and impart the light emitted from the light source 2 with stable light permeability when the light source 2 is turned on, so that it is possible to allow the light emitted from the light source 2 to transmit through the laminate 1A and be displayed with high brightness, in a stable way, without increasing the brightness of the light source 2, and provide improved visibility while the light source 2 is turned on.

Having the above-described characteristics, the laminate 1A can be used effectively as a surface layer in a molded article, display device, and the like, that displays light emitted from a light source and imparts decoration.

Modifications

Figure 5:
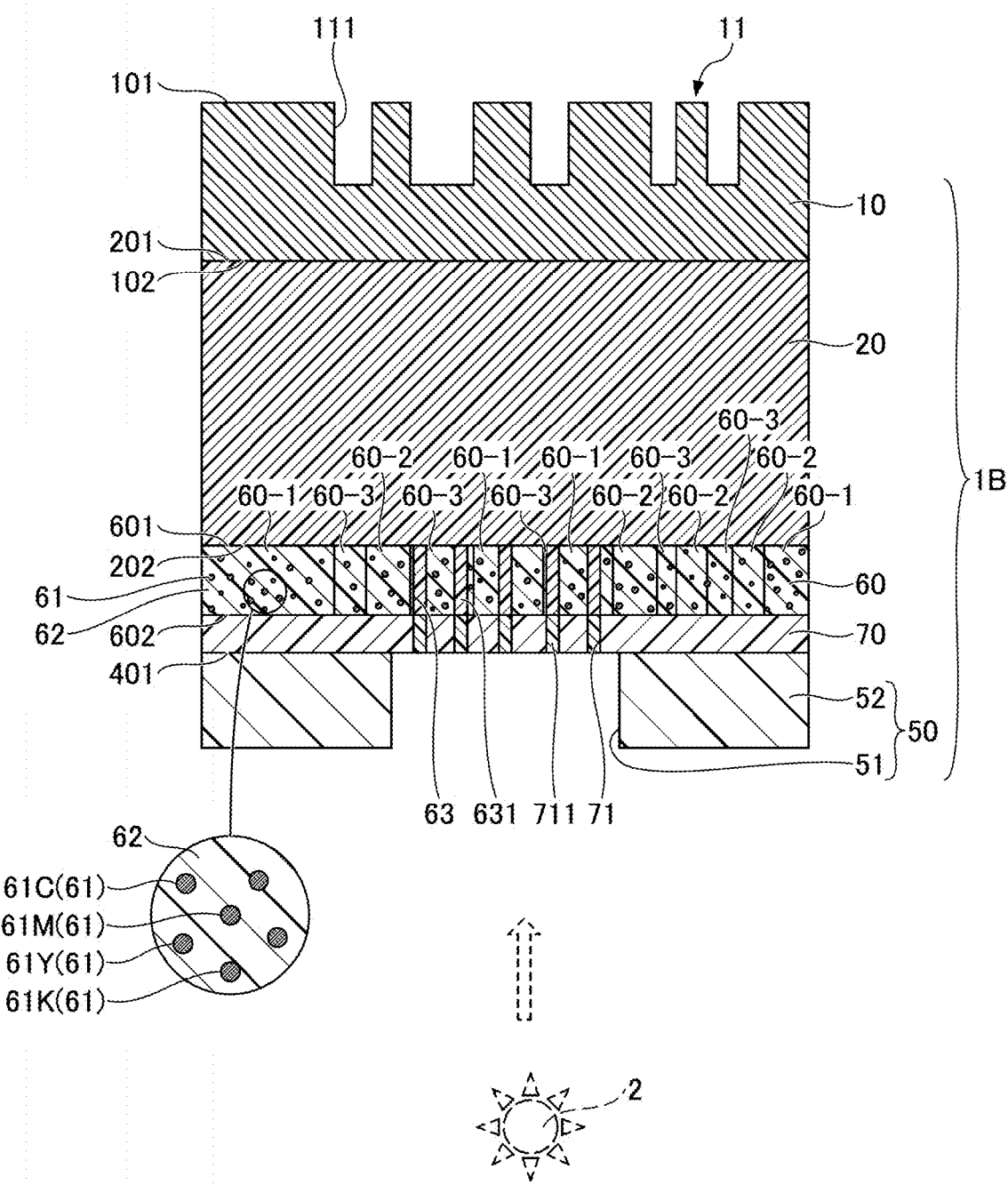
FIG. 5 is a cross-sectional view taken along the line A-A in FIG. 2, showing another example structure of the decorative laminate according to an embodiment of the present disclosure.

Another example structure of the laminate 1A of the present embodiment will be described. The laminate 1A may have a smoked white base layer and a pigment print layer containing an ultra-violet absorber, instead of the interference pigment print layer 30 and the smoked layer 40. FIG. 5 is a cross-sectional view of another example structure of the laminate according to the present embodiment, taken along the line A-A in FIG. 2. As illustrated in FIG. 5, the laminate 1B includes a light adjusting layer 10, a transparent substrate layer 20, a pigment print layer 60, a smoked white base layer 70, and a black layer 50, which are laminated in the order named.

(Pigment Print Layer)

The pigment print layer 60 is a print layer made by mixing pigments 61 that express four colors: cyan, magenta, yellow, and black. The pigment print layer 60 contains multiple types of particulate pigments 61 (cyan, magenta, yellow, and black) and an ultra-violet absorber as an additive in a binder resin 62, thereby presenting a visible design and providing light-scattering properties. Note that the pigments 61 to be mixed are in no way limited to these four colors. Two or three colors from among cyan, magenta, yellow, and black may be mixed, or five or more colors including, for example, cyan, magenta, yellow, black, and white may be mixed. When using white pigments, for example, the above-described interference pigments, as well as pigments having a scattering effect such as silica can be used as a pigment that can express a highly light-permeable white color.

The pigments 61 may include a pigment 61C, which is cyan, a pigment 61M, which is magenta, a pigment 61Y, which is yellow, and a pigment 61K, which is black. Any pigment of common use can be used for the pigments 61.

The pigment print layer 60 contains multiple types of pigment print layers 60-N (N being an integer of 1 or more) according to the mixed colors that appear depending on the type of the pigments 61C, 61M, 61Y and 61K and the respective amounts of the pigments 61C, 61M, 61Y and 61K. In FIG. 5, the pigment print layer 60 includes a first the pigment print layer 60-1, a second the pigment print layer 60-2, and a third the pigment print layer 60-3.

The first the pigment print layer 60-1, the second the pigment print layer 60-2, and the third the pigment print layer 60-3 each contain, in the binder resin 32, four types of pigments 61 that emit four colors of light (cyan, magenta, yellow, and black). Like the first interference pigment print layer 30-1, the second interference pigment print layer 30-2, and the third interference pigment print layer 30-3, in FIG. 5, four types of pigments 61 are additively mixed in predetermined proportions in the first the pigment print layer 60-1, the second the pigment print layer 60-2, and the third the pigment print layer 60-3, thereby expressing the "dark brown," "light brown," and "black" of the wood-grain pattern as a first mixed color, a second mixed color, and a third mixed color.

The ultra-violet absorber and binder resin 62 contained in the pigment print layer 60 are the same as the ultra-violet absorber and binder resin 32 used in the interference pigment print layer 30, and so their detailed description will be omitted.

The pigment print layer 60 has third light transmitting parts 63 that are light-permeable. The third light transmitting parts 63 are unprinted areas where no pigment 61 is contained.

The third light transmitting parts 63 can be formed with coating-layer void parts 631, which are through-holes provided in the pigment print layer 60. The coating-layer void parts 631 may contain a cured substance of a light-permeable filler resin composition. The third light transmitting parts 63 and the filler resin composition are structured the same as the first light transmitting parts 33 and the filler resin composition of the interference pigment print layer 30, and so their detailed explanation will be omitted.

The shape, arrangement, proportion, and the method of formation of the third light transmitting parts 63 may be the same as the shape, arrangement, and proportion of the first light transmitting parts 33.

That is, like the first light transmitting parts 33, the third light transmitting parts 63 may be formed in any suitable shape in plan view, such as a circle, an ellipse, or a polygon such as a square. Like the first light transmitting parts 33, the third light transmitting parts 63 may be positioned in any suitable arrangement on the main surface 601 of the third light transmitting parts 63, such as a hexagonal lattice pattern, a square lattice pattern, a diagonal lattice pattern, a linear pattern, or the like. Alternatively, the third light transmitting parts 63 may be disposed substantially evenly at predetermined intervals on the main surface 301 in plan view, or may be disposed irregularly. Like the first light transmitting parts 33, the proportion of the third light transmitting parts 63 is preferably 0.1% to 35% in plan view of the pigment print layer 60, more preferably 0.5% to 18%, and even more preferably 1.0% to 15%.

The method of forming the third light transmitting parts 63 can be the same as the method of forming the first light transmitting parts 33, and so its detailed explanation will be omitted.

(Smoked-White Base Layer)

The smoked-white base layer 70 is provided at the lower surface 602 of the pigment print layer 60. The smoked-white base layer 70, like the smoked layer 40, is a single layer and has a predetermined range of light transmittance (for example, considering the smoked-white base layer 70 alone, 1% to 70%, preferably 1% to 47%). Therefore, like the smoked layer 40, the smoked-white base layer 70 has a function to make the design of the pigment print layer 60 easier to see when the light source 2 is turned off, thereby improving the visibility and distinguishability of the design and the quality of display, and to provide a light transmittance in a predetermined range over the entire laminate 1B including the coating-layer void parts 631 when the light source 2 is turned on (for example, this is 30% to 70%, preferably 53% to 70%, and overall 30% to 50%, considering the smoked-white base layer 700 alone).

The smoked-white base layer 70 can be formed, for example, by printing an ink composition containing a pigment or a dye of a light attenuation color (for example, white) and an ultra-violet absorber in a transparent binder resin. For the smoked-white base layer 70, for example, a layer formed by printing a white ink composition can be used.

The smoked-white base layer 70, like the pigment print layer 60, has fourth light transmitting parts 71 that are light-permeable. Like the third light transmitting parts 63, the fourth light transmitting parts 71 are unprinted areas where no pigment 61 is contained. The fourth light transmitting parts 71 may be filled with a binder resin (not shown).

The positioning of the fourth light transmitting parts 71 may be the same as the positioning of the second light transmitting parts 41. That is, each fourth light transmitting part 71 may be located at a position where it at least partially overlaps a third light transmitting part 63 in plan view of the main surface of the smoked-white base layer 70. The fourth light transmitting parts 71 are preferably located at substantially the same positions as the third light transmitting parts 63 on a main surface of the smoked-white base layer 70 in plan view.

Like the pigment print layer 60, the fourth light transmitting parts 71 can be formed with the coating-layer void parts 711 of the smoked-white base layer 70. The coating-layer void parts 711 contain a cured substance of a light-permeable filler resin composition. For the light-permeable filler resin composition to be contained in the fourth light transmitting parts 71, the light-permeable filler resin composition filled in the coating-layer void parts 631 can be used.

Note that the light-permeable filler resin composition may be contained only in the coating-layer void parts 631 of the pigment print layer 60 or in the coating-layer void parts 711 of the smoked-white base layer 70, or may be contained only in part of the coating-layer void parts 631 and 711.

The fourth light transmitting parts 71 may be shaped and positioned in the same way as the third light transmitting parts 63, or may be shaped and positioned differently. From the perspective of allowing the light from the light source 2 to transmit through the pigment print layer 60 and the smoked-white base layer 70 with ease, it is preferable to shape and position the fourth light transmitting parts 71 the same as the third light transmitting parts 63.

Like the third light transmitting parts 63, the fourth light transmitting parts 71 can be formed by using a method such as laser processing.

It is preferable if the proportion of the fourth light transmitting parts 71 is the same as that of the third light transmitting parts 63.

The fourth light transmitting parts 71 are located in the same positions or substantially the same positions as the third light transmitting parts 63, in plan view of the pigment print layer 60. The proportion of the third light transmitting parts 63 and the fourth light transmitting parts 71 in plan view of the pigment print layer 60 or the smoked-white base layer 70 is preferably 0.1% to 20%, more preferably 0.5% to 18%, and even more preferably 1.0% to 15%, like the proportion of the third light transmitting parts 63.

The light transmittance of the laminated part of the pigment print layer 60 and the smoked-white base layer 70 is preferably 23% to 51%, more preferably 33% to 41%.

<Decorative Molded Article>

Figure 6:
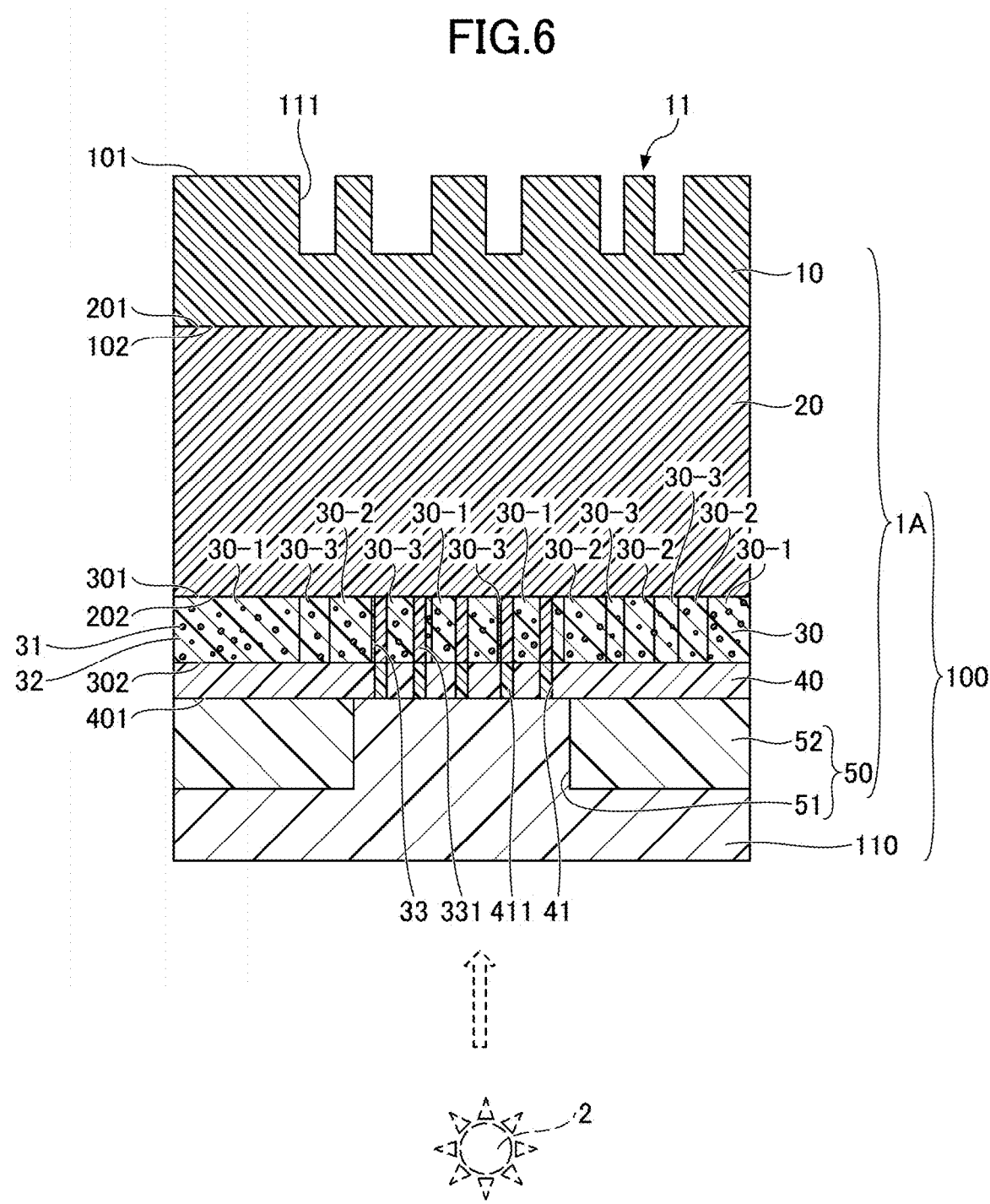
FIG. 6 is a partially-enlarged cross-sectional view of a decorative molded article with the decorative laminate according to an embodiment of the present disclosure.

A decorative molded article incorporating the laminate 1A of the present embodiment will be described. FIG. 6 is a partially enlarged cross-sectional view showing a part of the decorative molded article incorporating the laminate 1A of the present embodiment. As illustrated in FIG. 6, the decorative molded article 100 includes: a molded article 110; and the laminate 1A, which is attached to a surface of the molded article 110. Note that a binder layer may be provided on the surface of the molded article 110, and the back surface of the laminate 1A may be attached to a surface of the molded article 110 via the binder layer.

The molded article 110 may be made of a material having a high light transmittance. Examples of materials having a high light transmittance include olefin resins, acrylic resins, styrene resins, vinyl resins, fluorine resins, engineering plastic, super-engineering plastic, bio-engineering plastic, biodegradable plastic, thermosetting resins, and glass. These materials may be used alone or used in combination of two or more.

Examples of olefin resins include: polyethylene resins such as polyethylene (PE), high-density polyethylene, and low-density polyethylene; polypropylene resins such as polypropylene (PP) and propylene-ethylene copolymers; and cycloolefin resins such as a cycloolefin polymer (COP), cycloolefin copolymer (COC), and an ethylene-cyclic olefin copolymer. Among these, it is preferable to use cycloolefin resins, from the perspective of ease of production, the wide range of wavelength through which light can transmit, and chemical resistance; among these, COP and COC are particularly preferable.

Polymethyl methacrylate (PMMA) is an example of an acrylic resin.

Examples of styrene resins include polystyrene (PS), an acrylonitrile-styrene resin, and an acrylonitrile-butadiene-styrene (ABS) resin.

Examples of vinyl resins include a polyvinyl chloride (PVC) resin, a vinylidene chloride resin, a polyacrylonitrile, a polyvinyl acetate, an acrylic acid copolymer, and a polyvinyl alcohol.

Examples of fluorine-based resins include polytetrafluoroethylene (PTFE), polychlorotrifluoroethylene (PCTFE), polyvinyl fluoride resin, and polyvinylidene fluoride.

Examples of engineering plastics include: a polycarbonate (PC) resin; a polyacetal (POM) resin; a polyester resin such as polyethylene terephthalate (PET), polybutylene terephthalate (PBT), and polycyclohexylene dimethyl terephthalate; a polyphenylene ether (PPE) resin; a polyphenylene oxide; and a polyamide (PA) resin such as nylon 6, nylon 66, and aromatic polyamide.

Examples of super-engineering plastics include: a polyphenylene sulfide (PPS) resin; a polysulfone (PSF) resin; polyethersulfone (PES); polyetheretherketone (PEEK); a polyarylate resin; an aromatic polyester resin; a polyimide (PI) resin; a polyamideimide (PAI) resin; a polyetherimide (PEI) resin; and an aramid resin.

Bio-engineering plastics are made primarily from plant-derived isosorbide (isosorbide), and are copolymers of isosorbide and engineering plastics, which are copolymerization components.

Isosorbide is obtained by dehydrating and condensing sorbitol, which is produced from various starches that are abundantly present as plant-derived resources and are readily available. Isosorbide is secondary heterocyclic diol (dihydroxy compound) derived from plant materials such as starch and glucose. Isosorbide has a rigid condensed annular structure, which can impart high heat resistance and rigidity to the resin derived from it. Copolymers using isosorbide are amorphous, and the glass transition temperature can be adjusted by selecting the copolymerization component and the copolymerization ratio.

In isosorbide, a heterocyclic structure with ether linkages activates the hydroxyl group, so that, despite being a secondary diol, it exhibits high acidity. By transesterifying isosorbide with engineering plastic, it is possible to obtain a high molecular weight polymer, which is bio-engineering plastic. The method of polymerization is transesterification or melt-polymerization (melting). Group 2 metals (salts) that exhibit relatively soft basicity, such as calcium and magnesium, exhibit high polymerization activity.

Examples of biodegradable plastics include polylactic acid (PLA), polyhydroxyalkanoate (PHA), polybutylene succinate (PBS), and polycaprolactone (PCL).

Examples of thermosetting resins include an epoxy resin, a silicone resin, a phenol resin, an unsaturated polyester resin, and a polyurethane resin.

The molded article 110 is preferably a composite containing engineering plastic (especially PC resin), bioengineering plastic, or biodegradable plastic, and a transparent resin.

The method of producing the decorative molded article 100 is not limited to a particular type, and any general method of molding the molded article 110 and the laminate 1A integrally can be used. The decorative molded article 100 can be obtained, for example, by molding the laminate 1A integrally with the molded article 110 via a binder layer on the back surface thereof, at the same time as the injection molding of the molded article 110. An optical clear adhesive sheet (OCA) may be affixed to the back surface of the laminate 1A instead of a binder layer, and then the laminate may be attached to a molded body prepared in a separate process based on a vacuum/compressed air lamination method (TOM molding) or the like to form an integrated molded product.

In this way, by providing the laminate 1A in the molded article 110, the decorative molded article 100 can: ensure sufficient stealth properties so that the visibility of the light source 2 and the opening 51 in the black layer 50 from the surface of the laminate 1A when the light source 2 is turned off is reduced; transmit and display the light emitted from the light source 2 with high brightness without increasing the brightness of the light source 2 when the light source 2 is turned on; and increase the diffuse transmittance to provide improved visibility of the light source 2 when it is turned on. As a result of this, the decorative molded article 100 can show the design on a surface of the laminate 1A when the light source 2 is turned off, and, when the light source 2 is turned on, letters and the like made visible by the light from the light source 2 are clearly displayed on the surface of the laminate 1A, making them easily visible from the outside.

Because the decorative molded article 100 has the above-described characteristics, the decorative molded article 100 can be suitably used for, for example, a vehicle interior part such as the front panel, center console rear panel, and a door of a vehicle, a building interior material, a housing for home appliances, and the like.

<Display Device>

A display device including the laminate 1A of the present embodiment will be described. Note that, in this example, the display device is used as the front panel of a vehicle.

Figure 7:
FIG. 7 is a plan view of an example of a display device with the decorative laminate according to an embodiment of the present disclosure, showing the device in an unlit state and in a lit state.
Figure 7:
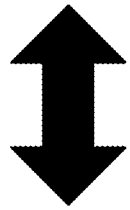
Figure 7:
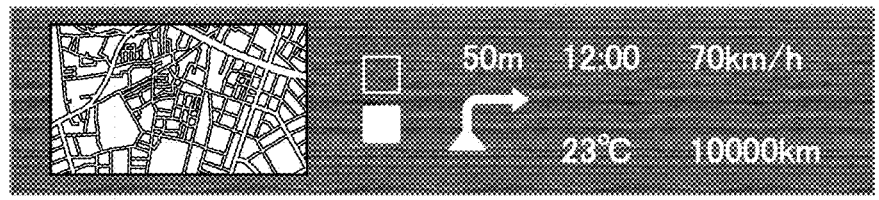
Figure 8:
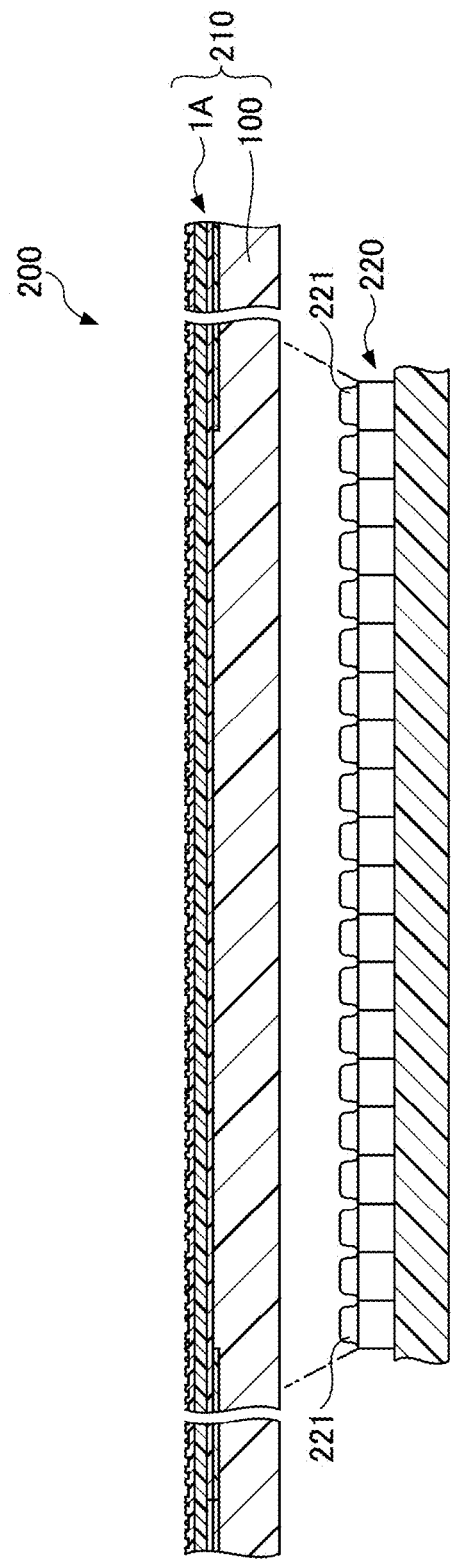
FIG. 8 is a partially-enlarged cross-sectional view of FIG. 7.

FIG. 7 is a plan view of an example of a display device having a laminate according to an embodiment of the present disclosure, showing a state in which the display device is turned off and a state in which the display device is turned on. FIG. 8 is a cross-sectional view of a part of FIG. 7, showing a part of the display device including the laminate according to the present embodiment. Note that the layer structure of the laminate of the display device is the same as the layer structure illustrated in FIG. 3 or FIG. 6; FIG. 8 therefore simply shows the layer structure of the laminate of the display device.

As illustrated in FIG. 7, the display device 200 has a front panel 210, which is a decorative molded article, in which a laminate 1A with a wood-grain design is attached to a surface of the molded article. The display device 200 also has a display part 220 on the back surface of the front panel 210. The above-described decorative molded article 100 is used in the front panel 210, and therefore detailed description of the front panel 210 will be omitted.

The display part 220 has a light sources 221, which is formed with multiple light-emitting parts arranged in a matrix, and which is a display that displays characters, numbers, images, and so forth, on a surface of the front panel 210. The display part 220 is positioned such that the light emitted from a light source 221 transmits through the front panel 210.

The light source 221 is not limited to a particular type, and, for example, an LED or LCD device may be used.

As illustrated in FIG. 7, when the display part 220 of the display device 200 is turned off, only the wood-grain design is visible on the surface of the laminate 1A of the front panel 210. When the display part 220 is turned on, the light emitted from the display part 220 transmits through the front panel 210, and thereupon images such as a map, a driving route, the time, temperature, speed, and total travelling distance are displayed on the surface of the front panel 210. Note that these images are not limited to symbols and figures for telling information, and decorative patterns and signals, for example, may be displayed as well.

Since the display device 200 includes the front panel 210 and the display part 220, and the front panel 210 includes the laminate 1A, it is possible to: ensure sufficient stealth properties that reduce the visibility of the display part 220 from the surface of the laminate 1A when the light source 2 is turned off; transmit and display the display screen emitted from display part 2202 at high brightness when display part 220 is turned on, without increasing the brightness of the display part 220; and provide improved visibility when the light source 2 is turned on by increasing the diffuse transmittance, thereby allowing the people inside the vehicle such as the driver to see the display screen with ease.

As described above, an embodiment of the present disclosure has been described above, but the above embodiment is presented simply as an example, and the present disclosure is in no way limited to the above embodiment. The above embodiment can be implemented in a variety of other forms, and various combinations, omissions, substitutions, modifications, and so forth can be made without departing from the spirit of the invention. Such potential embodiments and variations are all included in the scope and spirit of the invention, and are included in the scope of the invention and its equivalents described in the claims.

Note that, the present disclosure of the embodiment is, for example, as follows:

<1> A decorative laminate for transmitting light emitted from a light source, the decorative laminate including:
a light-permeable substrate with a first main surface and a second main surface, the second main surface being a surface opposite the first main surface;
a light adjusting layer provided on a side of the substrate where the first main surface is situated;

an interference pigment print layer provided on a side of the substrate where the second main surface is situated, containing a plurality of types of interference pigments and an ultra-violet absorber in a binder resin, and showing a visible design; and a black semi-transparent print layer on a surface of the interference pigment print layer that is opposite from the substrate, and containing a pigment and an ultra-violet absorber in a binder resin, in which:

the light adjusting layer has, at a surface opposite from the substrate, an uneven part that is formed to match a shape of the design shown by the interference pigment print layer;

the interference pigment print layer has first light transmitting parts, through which the light is transmitted;

the black semi-transparent print layer has second light transmitting parts, through which the light is transmitted, at positions at a main surface of the black semi-transparent print layer where, in plan view, the second light transmitting parts at least partially overlap the first light transmitting parts; and the first light transmitting parts and the second light transmitting parts are voids in a coating layer and formed at a main surface of the interference pigment print layer and at the main surface of the black semi-transparent print layer, respectively.

<2> The decorative laminate according to <1>, in which at least one of the first light transmitting parts or the second light transmitting parts includes a cured substance of a light-permeable filler resin composition inside the voids in the coating layer.

<3> The decorative laminate according to <1> or <2>, further including a black symbol print layer on a surface of the black semi-transparent print layer that is opposite from the interference pigment print layer, in which the black symbol print layer has an opening formed such that areas where the second light transmitting parts are formed are exposed.

<4> The decorative laminate according to one of <1> to <3>, in which:

the first light transmitting parts and the second light transmitting parts are formed at substantially same locations in plan view; and in plan view of the interference pigment print layer, the first light transmitting parts and the second light transmitting parts occupy a proportion of 0.1% to 20%.

<5> The decorative laminate according to one of <1> to <4>, in which at least one of the first light transmitting parts or the second light transmitting parts is arranged in a hexagonal lattice pattern, a square lattice pattern, a diagonal lattice pattern, or a linear pattern.

<6> The decorative laminate according to one of <1> to <5>, in which a sum of thicknesses of the interference pigment print layer and the black semi-transparent print layer is 1 μm to 50 μm.

<7> A decorative laminate for transmitting light emitted from a light source, the decorative laminate including:

a light-permeable substrate with a first main surface and a second main surface, the second main surface being a surface opposite the first main surface;

a light adjusting layer provided on a side of the substrate where the first main surface is situated;

a pigment print layer, provided on a side of the substrate where the second main surface is situated, containing a plurality of types of pigments and an ultra-violet absorber in a binder resin, showing a visible design, and having light-refracting, light-reflecting, or light-scattering properties; and a smoked white base layer on a surface of the pigment print layer that is opposite from the substrate, and containing a pigment and an ultra-violet absorber in a binder resin, in which:

the light adjusting layer has, at a surface opposite from the substrate, an uneven part that is formed to match a shape of the design shown by the pigment print layer;

the pigment print layer has third light transmitting parts, through which the light is transmitted, at a main surface of the pigment print layer;

the smoked white base layer has fourth light transmitting parts, through which the light is transmitted, at positions at a main surface of the smoked white base layer where, in plan view, the fourth light transmitting parts at least partially overlap the third light transmitting parts; and the third light transmitting parts and the fourth light transmitting parts are voids in a coating layer and formed at the main surface of the pigment print layer and at the main surface of the smoked white base layer, respectively.

<8> The decorative laminate according to <7>, in which at least one of the third light transmitting parts or the fourth light transmitting parts includes a cured substance of a light-permeable filler resin composition inside the voids in the coating layer.

<9> The decorative laminate according to <7> or <8>, further including a black symbol print layer on a surface of the smoked white base layer that is opposite from the pigment print layer, in which the black symbol print layer has an opening formed such that areas in the smoked white base layer where the light transmitting parts are formed are exposed.

<10> The decorative laminate according to one of <7> to <9>, in which:

the third light transmitting parts and the fourth light transmitting parts are located at substantially same locations in plan view; and in plan view of the pigment print layer, the third light transmitting parts and the fourth light transmitting parts occupy a proportion of 0.1% to 20%.

<11> The decorative laminate according to one of <7> to <10>, in which at least one of the third light transmitting parts or the fourth light transmitting parts is arranged in a hexagonal lattice pattern, a square lattice pattern, a diagonal lattice pattern, or a linear pattern.

<12> The decorative laminate according to one of <7> to <11>, in which a sum of thicknesses of the pigment print layer and the smoked white base layer is 1 μm to 50 μm.

<13> A decorative molded article including:

a molded article; and the decorative laminate of <1> or <8>, provided on at least a part of a surface of the molded article.

<14> A display device including:

the decorative molded article of <13>; and a light source positioned on a back side of the decorative molded article.

What is claimed is:

1. A decorative laminate for transmitting light emitted from a light source, the decorative laminate comprising:

a light-permeable substrate with a first main surface and a second main surface, the second main surface being a surface opposite the first main surface;

a light adjusting layer provided on a side of the substrate where the first main surface is situated;

an interference pigment print layer provided on a side of the substrate where the second main surface is situated, containing a plurality of types of interference pigments and an ultra-violet absorber in a binder resin, and showing a visible design; and a black semi-transparent print layer on a surface of the interference pigment print layer that is opposite from the substrate, and containing a pigment and an ultra-violet absorber in a binder resin, wherein the light adjusting layer has, at a surface opposite from the substrate, an uneven part that is formed to match a shape of the design shown by the interference pigment print layer, wherein the interference pigment print layer has first light transmitting parts, through which the light is transmitted, wherein the black semi-transparent print layer has second light transmitting parts, through which the light is transmitted, at positions at a main surface of the black semi-transparent print layer where, in plan view, the second light transmitting parts at least partially overlap the first light transmitting parts, and wherein the first light transmitting parts and the second light transmitting parts are voids in a coating layer and formed at a main surface of the interference pigment print layer and at the main surface of the black semi-transparent print layer, respectively.

2. The decorative laminate according to claim 1, wherein at least one of the first light transmitting parts or the second light transmitting parts includes a cured substance of a light-permeable filler resin composition inside the voids in the coating layer.

3. The decorative laminate according to claim 1, further comprising a black symbol print layer on a surface of the black semi-transparent print layer that is opposite from the interference pigment print layer, wherein the black symbol print layer has an opening formed such that areas where the second light transmitting parts are formed are exposed.

4. The decorative laminate according to claim 1, wherein the first light transmitting parts and the second light transmitting parts are formed at substantially same locations in plan view, and wherein, in plan view of the interference pigment print layer, the first light transmitting parts and the second light transmitting parts occupy a proportion of 0.1% to 20%.

5. The decorative laminate according to claim 1, wherein at least one of the first light transmitting parts or the second light transmitting parts is arranged in a hexagonal lattice pattern, a square lattice pattern, a diagonal lattice pattern, or a linear pattern.

6. The decorative laminate according to claim 1, wherein a sum of thicknesses of the interference pigment print layer and the black semi-transparent print layer is 1 μm to 50 μm.

7. A decorative molded article comprising:
a molded article; and
the decorative laminate of claim 1, provided on at least a part of a surface of the molded article.

8. A display device comprising:
the decorative molded article of claim 7; and
a light source positioned on a back side of the decorative molded article.

9. A decorative laminate for transmitting light emitted from a light source, the decorative laminate comprising:

a light-permeable substrate with a first main surface and a second main surface, the second main surface being a surface opposite the first main surface;

a light adjusting layer provided on a side of the substrate where the first main surface is situated;

a pigment print layer, provided on a side of the substrate where the second main surface is situated, containing a plurality of types of pigments and an ultra-violet absorber in a binder resin, showing a visible design, and having light-refracting, light-reflecting, or light-scattering properties; and a smoked white base layer on a surface of the pigment print layer that is opposite from the substrate, and containing a pigment and an ultra-violet absorber in a binder resin, wherein the light adjusting layer has, at a surface opposite from the substrate, an uneven part that is formed to match a shape of the design shown by the pigment print layer, wherein the pigment print layer has third light transmitting parts, through which the light is transmitted, at a main surface of the pigment print layer, wherein the smoked white base layer has fourth light transmitting parts, through which the light is transmitted, at positions at a main surface of the smoked white base layer where, in plan view, the fourth light transmitting parts at least partially overlap the third light transmitting parts, and wherein the third light transmitting parts and the fourth light transmitting parts are voids in a coating layer and formed at the main surface of the pigment print layer and at the main surface of the smoked white base layer, respectively.

10. The decorative laminate according to claim 9, wherein at least one of the third light transmitting parts or the fourth light transmitting parts includes a cured substance of a light-permeable filler resin composition inside the voids in the coating layer.

11. The decorative laminate according to claim 9, further comprising a black symbol print layer on a surface of the smoked white base layer that is opposite from the pigment print layer, wherein the black symbol print layer has an opening formed such that areas in the smoked white base layer where the light transmitting parts are formed are exposed.

12. The decorative laminate according to claim 9, wherein the third light transmitting parts and the fourth light transmitting parts are located at substantially same locations in plan view, and wherein, in plan view of the pigment print layer, the third light transmitting parts and the fourth light transmitting parts occupy a proportion of 0.1% to 20%.

13. The decorative laminate according to claim 9, wherein at least one of the third light transmitting parts or the fourth light transmitting parts is arranged in a hexagonal lattice pattern, a square lattice pattern, a diagonal lattice pattern, or a linear pattern.

14. The decorative laminate according to claim 9, wherein a sum of thicknesses of the pigment print layer and the smoked white base layer is 1 μm to 50 μm.

* * * * *